(12) United States Patent
Cui et al.

(10) Patent No.: US 10,610,982 B2
(45) Date of Patent: Apr. 7, 2020

(54) WELD FILLER METAL FOR SUPERALLOYS AND METHODS OF MAKING

(71) Applicant: General Electric Company, Schenectady, NY (US)

(72) Inventors: Yan Cui, Greer, SC (US); Srikanth Chandrudu Kottilingam, Simpsonville, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 861 days.

(21) Appl. No.: 14/939,099

(22) Filed: Nov. 12, 2015

(65) Prior Publication Data

US 2017/0136586 A1  May 18, 2017

(51) Int. Cl.
  *B23K 35/00* (2006.01)
  *B23K 35/40* (2006.01)
  *B23K 35/30* (2006.01)
  *B23K 35/02* (2006.01)

(52) U.S. Cl.
  CPC ........ *B23K 35/404* (2013.01); *B23K 35/0227* (2013.01); *B23K 35/0233* (2013.01); *B23K 35/0238* (2013.01); *B23K 35/304* (2013.01); *B23K 35/3033* (2013.01); *B23K 35/3046* (2013.01)

(58) Field of Classification Search
  CPC .............. B23K 35/404; B23K 35/0238; B23K 35/0233; B23K 35/3033; B23K 35/0227; B23K 35/3046; B23K 35/304; B23K 2035/408

USPC ............ 228/126–134; 219/137.8, 145.1–147
See application file for complete search history.

(56) References Cited

U.S. PATENT DOCUMENTS

| | | | | |
|---|---|---|---|---|
| 1,703,940 A | * | 3/1929 | Kollmar | B23K 5/16 |
| | | | | 428/672 |
| 1,756,568 A | * | 4/1930 | Pennington | B23K 35/0261 |
| | | | | 428/683 |
| 1,841,624 A | * | 1/1932 | Mott | B23K 35/0261 |
| | | | | 420/120 |
| 1,937,574 A | * | 12/1933 | Johnston | B23K 35/0272 |
| | | | | 219/145.41 |
| 1,953,915 A | * | 4/1934 | Burgett | B23K 9/122 |
| | | | | 285/55 |
| 1,963,745 A | * | 6/1934 | Ingersoll | B23K 20/22 |
| | | | | 228/129 |

(Continued)

FOREIGN PATENT DOCUMENTS

| | | | | |
|---|---|---|---|---|
| CA | 2230186 A1 | * | 8/1999 | ......... B23K 35/0272 |
| CA | 2519060 A1 | * | 4/2006 | ............. B23K 9/173 |

(Continued)

OTHER PUBLICATIONS

European Search Report for EP Application No. 16198108.9 dated Mar. 10, 2017, 8 pages.

(Continued)

*Primary Examiner* — Kiley S Stoner
(74) *Attorney, Agent, or Firm* — James Pemrick; Hoffman Warnick LLC (57) ABSTRACT

A method of making a weld filler metal for a superalloy for welding is disclosed. The method includes enclosing a welding rod in a first foil layer and sintering the welding rod and the first foil layer. Related processes and articles are also disclosed.

19 Claims, 6 Drawing Sheets

(56) References Cited

U.S. PATENT DOCUMENTS

| | | | | |
|---|---|---|---|---|
| 1,993,931 A * | 3/1935 | Johnston | B23K 35/365 | 148/23 |
| 1,995,584 A * | 3/1935 | Sarazin | B23K 35/0272 | 219/145.32 |
| 2,036,887 A * | 4/1936 | Rolfs | B65H 81/08 | 242/441.3 |
| 2,063,182 A * | 12/1936 | Miller | B23K 35/0261 | 219/146.31 |
| 2,219,462 A * | 10/1940 | Wissler | B23K 35/3046 | 219/146.22 |
| 2,319,977 A * | 5/1943 | Cape | B23K 35/3093 | 219/145.1 |
| 2,464,186 A * | 3/1949 | Ross | B23K 35/0283 | 219/145.32 |
| 2,553,132 A | 5/1951 | Cape et al. | | |
| 2,612,583 A * | 9/1952 | Bernard | B23K 35/40 | 219/145.22 |
| 2,635,330 A * | 4/1953 | Fentress | B23K 11/0876 | 29/454 |
| 3,004,873 A * | 10/1961 | Strohmeier | B23K 35/0261 | 148/26 |
| 3,011,255 A * | 12/1961 | Washburn | B23K 11/02 | 228/125 |
| 3,102,827 A * | 9/1963 | Kriewall | B23K 35/0272 | 148/24 |
| 3,321,944 A * | 5/1967 | Ball | B23K 35/0272 | 219/145.23 |
| 3,322,156 A * | 5/1967 | Stuart | B31C 3/00 | 138/143 |
| 3,479,157 A | 11/1969 | Richards et al. | | |
| 3,698,223 A * | 10/1972 | Sagara | B01J 3/048 | 72/146 |
| 3,800,405 A * | 4/1974 | Ziemek | B23K 20/001 | 228/126 |
| 4,285,459 A | 8/1981 | Baladjanian et al. | | |
| 4,494,603 A * | 1/1985 | Harguindey | B01D 29/111 | 166/230 |
| 4,568,813 A * | 2/1986 | Andersen | B23K 35/365 | 149/37 |
| 4,584,459 A * | 4/1986 | Merrick | B23K 35/308 | 219/146.1 |
| 4,804,818 A * | 2/1989 | Andersen | B23K 35/0261 | 219/145.23 |
| 5,006,289 A * | 4/1991 | Yamamoto | B22F 3/12 | 264/125 |
| 5,114,641 A * | 5/1992 | Yamamoto | B22F 3/12 | 264/125 |
| 5,252,288 A * | 10/1993 | Yamamoto | B22F 3/12 | 419/26 |
| 5,480,601 A * | 1/1996 | Yamamoto | B22F 3/12 | 156/50 |
| 6,353,198 B1 | 5/2002 | Tong et al. | | |
| 6,905,728 B1 | 6/2005 | Hu et al. | | |
| 8,087,565 B2 | 1/2012 | Kottilingam et al. | | |
| 8,220,697 B2 | 7/2012 | Kottilingam et al. | | |
| 8,298,480 B2 | 10/2012 | Jones et al. | | |
| 2006/0076336 A1 * | 4/2006 | Nagarajan | B23K 9/173 | 219/145.1 |
| 2006/0131366 A1 | 6/2006 | Schaeffer et al. | | |
| 2006/0150388 A1 * | 7/2006 | Inada | B21C 37/0815 | 29/516 |
| 2006/0200963 A1 | 9/2006 | Lutz | | |
| 2006/0216540 A1 | 9/2006 | Budinger et al. | | |
| 2006/0255027 A1 * | 11/2006 | Katiyar | B23K 35/02 | 219/145.22 |
| 2011/0100970 A1 * | 5/2011 | Quintana | B23K 35/02 | 219/145.22 |
| 2012/0093284 A1 | 4/2012 | Takemoto et al. | | |
| 2012/0223057 A1 | 9/2012 | Iordache et al. | | |
| 2012/0255989 A1 | 10/2012 | Cui et al. | | |
| 2013/0086785 A1 | 4/2013 | Cui et al. | | |
| 2014/0212681 A1 | 7/2014 | Cui et al. | | |
| 2015/0298263 A1 * | 10/2015 | Goncharov | C23C 8/68 | 219/145.1 |
| 2017/0136586 A1 * | 5/2017 | Cui | B23K 35/0227 | |

FOREIGN PATENT DOCUMENTS

| | | | | |
|---|---|---|---|---|
| EP | 1486286 A2 | 12/2004 | | |
| EP | 1803521 A1 | 7/2007 | | |
| EP | 2759368 A1 | 7/2014 | | |
| EP | 2762257 A1 | 8/2014 | | |
| GB | 783435 A * | 9/1957 | | B23K 35/0272 |
| GB | 947474 A * | 1/1964 | | B23K 35/0272 |
| GB | 1133181 A * | 11/1968 | | B21C 37/12 |
| JP | H01-053797 A | 11/1989 | | |
| JP | H07-500539 A | 1/1995 | | |
| JP | 201179432 A | 7/2001 | | |
| JP | 2011033028 A | 2/2011 | | |
| WO | WO-8603716 A1 * | 7/1986 | | B23K 35/0272 |
| WO | 2014063222 A1 | 5/2014 | | |

OTHER PUBLICATIONS

Non Final Office Action for U.S. Appl. No. 14/577,191 dated Jan. Jan. 26, 2017; 28 pages.

Final Office Action dated Aug. 10, 2017 for U.S. Appl. No. 14/577,191 filed Dec. 19, 2014; 25 pages.

European Search Report and Opinion for EP Application No. 15199516.4, dated Apr. 29, 2016, 5 pages.

European Search Report & Opinion issued in connection with corresponding EP Application No. 16198108.9 dated Mar. 30, 2017.

Final Office Action dated Apr. 29, 2019 for U.S. Appl. No. 14/577,191, filed Dec. 19, 2014; pp. 17.

Search Report dated Jul. 22, 2019 for related Japanese Patent Application No. 2015-240683; pp. 23.

Office Action dated Sep. 27, 2019 for related Japanese Patent Application No. 2015-240683; pp. 7.

Non-Final Office Action dated Oct. 21, 2019 for U.S. Appl. No. 14/577,191 filed Dec. 19, 2014; pp. 17.

Final Office Action dated Feb. 5, 2020 for U.S. Appl. No. 14/577,191, filed Dec. 19, 2014; Pages 24.

Office Action dated Oct. 21, 2019 for U.S. Appl. No. 14/577,191, filed Dec. 19, 2014; Pages 21.

* cited by examiner

WELD FILLER METAL FOR SUPERALLOYS AND METHODS OF MAKING

BACKGROUND OF THE INVENTION

The disclosure relates generally to methods of making weld filler metals for superalloys.

Superalloys, especially those which are nickel based, typically have a poor weldability. As a result, many new weld filler metals have recently been developed.

However, developing a new weld filler metal typically includes choosing a new chemical composition of the weld filler metal, placing an order with a fabrication facility, and typically requires purchasing of at least 45.35 kg (100 lbs) or more of the new weld filler metal. Frequently, the fabrication facility must create ingots of the desired composition, heat treating the ingots, drawing them into rods, and testing the rods for strength and weldability. If the weld filler metal ordered does not fit the parameters ordered, the fabrication facility may have wasted time and material. If the weld filler metal meets the parameters, but the entity purchasing the weld filler metal finds that it does not work as desired, 45.35 kg (100 lbs) of weld filler material must be stored, sold, or destroyed with no use and no compensation for the cost of development of a failed weld filler metal.

BRIEF DESCRIPTION OF THE INVENTION

Embodiments of the invention disclosed herein may include a method of making a weld filler metal for use in a welding process with a superalloy, the method comprising: enclosing a welding rod in a first foil layer; and sintering the welding rod and the first foil layer.

Embodiments of the invention may also include a weld filler metal for use in a welding process with a superalloy, the weld filler metal made by a method comprising: enclosing a welding rod in a first foil layer; and sintering the welding rod and the first foil layer.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings. The detailed description explains embodiments of the invention, together with advantages and features, by way of example with reference to the drawings.

DETAILED DESCRIPTION OF THE INVENTION

As described herein, superalloys, especially nickel based alloys, have a very poor weldability. Attempts to develop new weld filler metals result in placing orders for multiple large batches of materials with different chemical compositions. As described herein, the process according to previous attempts can be cost prohibitive, resulting in multiple orders being paid for, the costs of testing each material, and the cost of warehousing failed materials adding up.

Previously boron (B), which was typically considered an impurity element in welding materials, was usually controlled to be reduced as much as possible in the material in order to decrease a tendency towards hot cracking. However, in controlled amounts, boron can actually minimize cracking in superalloys and even backfill any existing cracks. Exactly how much boron or similar material to use can be difficult to pinpoint for a particular superalloy, and can vary based on a composition of the superalloy, working conditions, the microstructure to be welded, phase diagrams of the materials, phase distributions, and characteristics of any base metal for the filler.

Accordingly, embodiments of the present invention include methods of more efficiently, in terms of both time and cost, developing and testing new weld filler metals without requiring bulk orders or long turnaround times when compared with conventional approaches.

Figure 1:
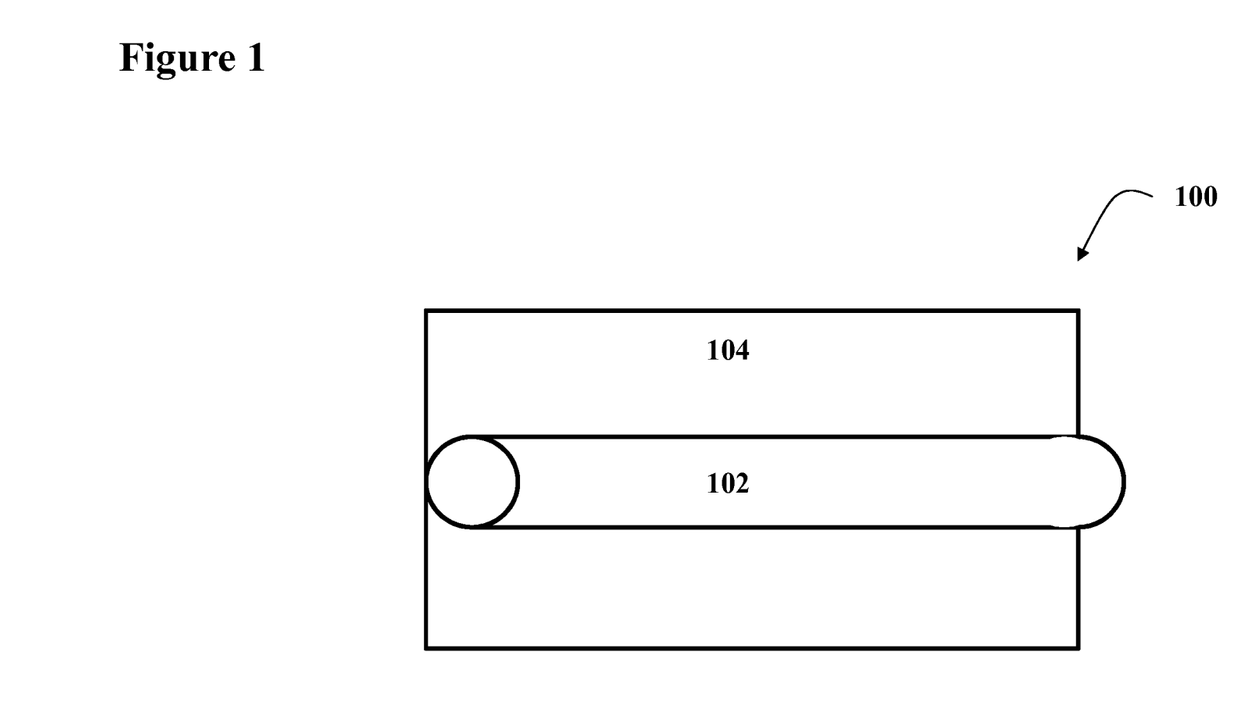
FIG. 1 shows a schematic diagram of a process of making a weld filler metal according to embodiments of the disclosure.

FIG. 1 is a schematic diagram of a precursor of a weld filler metal 100 according to some embodiments. A method of making weld filler metal 100, according to some embodiments, can include enclosing a welding rod 102 in a first foil layer 104. Methods of enclosing welding rod 102 can include wrapping, enveloping, or any other means of surrounding welding rod 102 in first foil layer 104. Welding rod 102 may be any material now known or later developed for welding, especially for welding a superalloy. Any commercial or non-commercial welding rod may be used. In some embodiments, welding rod 102 may include welding rods of approximately 0.020 to approximately 0.062 inches in diameter, in some embodiments approximately 0.030 to approximately 0.050 inches in diameter, and in some embodiments approximately 0.040 inches in diameter, and any length necessary for effective welding, with for instance, an arc welding, including but not limited to tungsten inert gas (TIG) welding. Additionally, the welding can include gas tungsten arc welding (GTAW), plasma arc welding, laser welding, and electron beam welding. For instance, a MarM247 filler rod may be used. In further embodiments, weld filler rod 102 may include a rod chosen from the following materials: IN738, R80, IN939, R142, R195, H188, H25, FSX414, RN2, and GTD111. These materials are further outlined in Table 1 below. The values are given as weight percent, and the nominal values should be understood to include ranges of weight percentage.

TABLE 1

| Material Name | Composition (wt %) |
|---|---|
| MarM247 | C Max: 0.06-0.09; Cr: 8.0-8.5; Ni: BAL; Mn: 0.10; Si: 0.25; W: 9.3-9.7; Co: 9.0-9.5; Al: 5.4-5.7; +Ta, Ti, Hf |
| IN738 | C: 0.17; Cr: 16.0; Ni: BAL; Co: 8.5; Mo: 1.7; W: 2.6; Nb: 2.0; Ta: 1.7; Ti: 3.4; Al: 3.4; B: 0.001; Zr: 0.1 |
| Rene80 | Ni: BAL; Cr: 14; Co: 9.5; Mo: 4; Al: 3; Ti: 5; W: 4; Zr: 0.03; C: 0.16; B: 0.015 |
| IN939 | C: 0.15; Cr: 22.4; Ni: BAL; Co: 19; W: 1.6; Nb/Cb: 1; Ta: 1.4; Ti: 3.7; Al: 1.9; B: 0.010; Zr: 0.1 |
| Rene142 | C: 0.12; Cr: 6.8; Ni: BAL; Co: 12; Mo: 1.5; W: 4.9; Ta: 6.3; Al: 6.1; Hf: 1.2; Re: 2.8; |
| Rene195 | C: 0.02; Cr: 7.6; Ni: BAL; Co: 3.1; Mo: 0.1; W: 3.9; Ta: 5.5; Al: 7.8; B: 0.015; Hf: 0.15; Re: 1.7 |
| HI188 | C: 0.10; Cr: 22.0; Ni: 22.0; Co: 39/BAL; W: 14.0; B: 0.015 Max; Fe: 3.0; Mn: 1.25 Max; Si: 0.35; La: 0.03 |
| H25 | C: 0.10; Cr: 20; Ni: 10; Co: 51/BAL; W: 15; Fe: 3 Max; Mn: 1.5; Si: 0.4 Max |
| FSX414 | C: 0.25 Max; Cr: 29; Ni: 10; Co: 52.75; W: 7.0; B: 0.01; Fe: 1.0; |
| ReneN2 | Ni: BAL; Cr: 13; Co: 7.5; Re: 1.6; W: 3.8; Al: 6.6; Ta: 5; Hf: 0.2 |
| GTD111 | Ni: BAL; Cr: 13.5; Co: 9.5; Ti: 4.75; W: 3.8; Al: 3.3; Ta: 2.7; Mo: 1.53; Fe: 0.23; C: 0.09; B: 0.01 |

As illustrated in FIG. 1, first foil layer 104 may be applied to welding rod 102, for instance, by wrapping a layer 104 of a first foil around welding rod 102. As should be clear, the length and width of first foil layer 104 may be determined by the size of welding rod 102 in order to sufficiently cover welding rod 102 in a single or multiple layers. For instance, in some embodiments, first foil layer 104 may be approximately 0.001 to 0.005 inches thick, depending on how much of a chemical composition of first foil layer 104 is intended to be included in weld filler metal 100, and may be approximately 0.3 to approximately 0.6 inches wide. In some embodiments, first layer of foil 104 may be approximately 0.003 inches thick and approximately 0.50 inches wide.

In some embodiments, first foil layer 104 may include an adhesive layer (not shown) on at least one surface of the foil. A thin layer of any now known or later developed adhesive may be used. For instance, commercially available brazing tape may include an adhesive for applying the tape, which can make application to welding rod 102 easier to achieve and align properly. First foil layer 104 may include between approximately 0.1% and approximately 2.0% of at least one of boron (B), silicon (Si), and germanium (Ge), depending on how much B, Si, and/or Ge are desired in the final weld filler metal 100 and what content is in welding rod 102. In some embodiments, the B, Si, and/or Ge content may include approximately 3.0%. For instance, Amdry 775 (BNi-9) brazing tape may be used for first foil layer 104. Additionally, brazing tapes may include BNi-2, BNi-5, BRB, and DF4B. These materials are further outlined in Table 2 below. The values are given as weight percent, and the nominal values should be understood to include ranges of weight percentage.

TABLE 2

| Material Name | Composition (wt %) |
|---|---|
| BNi-9 | Ni: BAL; Cr: 15.0; B: 3.6; P: 0.02 |
| BNi-2 | Ni: BAL; Cr: 7.0; Si: 4.5; B: 3.1; P: 0.02; Fe: 3.0 |
| BNi-5 | Ni: BAL; Cr: 19.0; Si: 10.1; B: 0.03; P: 0.02 |
| BRB | Ni: BAL; Cr: 13.0-14.0; Co: 9.0-10.0; Al: 3.5-3.8; B: 2.25-2.75 |
| BF4B | Ni: BAL; Cr: 14.0; Co: 10.0; Al: 3.5; B: 2.75; Ta: 2.5; Y: 0.1 |

By including a portion of B, Si, and/or Ge content from first foil layer 104 into welding rod 102, weld filler metal 100 can benefit in welding superalloys. For instance, when at least one of B, Si, and Ge are included in the chemical composition of weld filler metal 100 in an amount between approximately 0.1% and 2.0%, and in some embodiments between approximately 0.2% and 0.9%, weld filler metal 100 has an increased weldability as regards superalloys, such as Rene 108, Rene N2, GTD111, and GTD444. Additionally, weld filler metal 100 according to certain embodiments reduces the melting temperature of traditional weld filler metals, for instance from approximately 1371° C. (2500° F.) to approximately 982° C. (1800° F.) to approximately 1038° C. (1900° F.), lowering the heat necessary to apply weld filler metal 100 to a superalloy due to the temperature depressant properties of B, Si, and Ge.

Additionally, weld filler metal 100 can improve the mechanical properties of welds on both nickel and iron based superalloys when compared with conventional welds and approaches for welding. Weld filler metal 100, according to some embodiments, may also help in fixing cracks in a superalloy, as the material can backfill existing cracks during welding.

Figure 2:
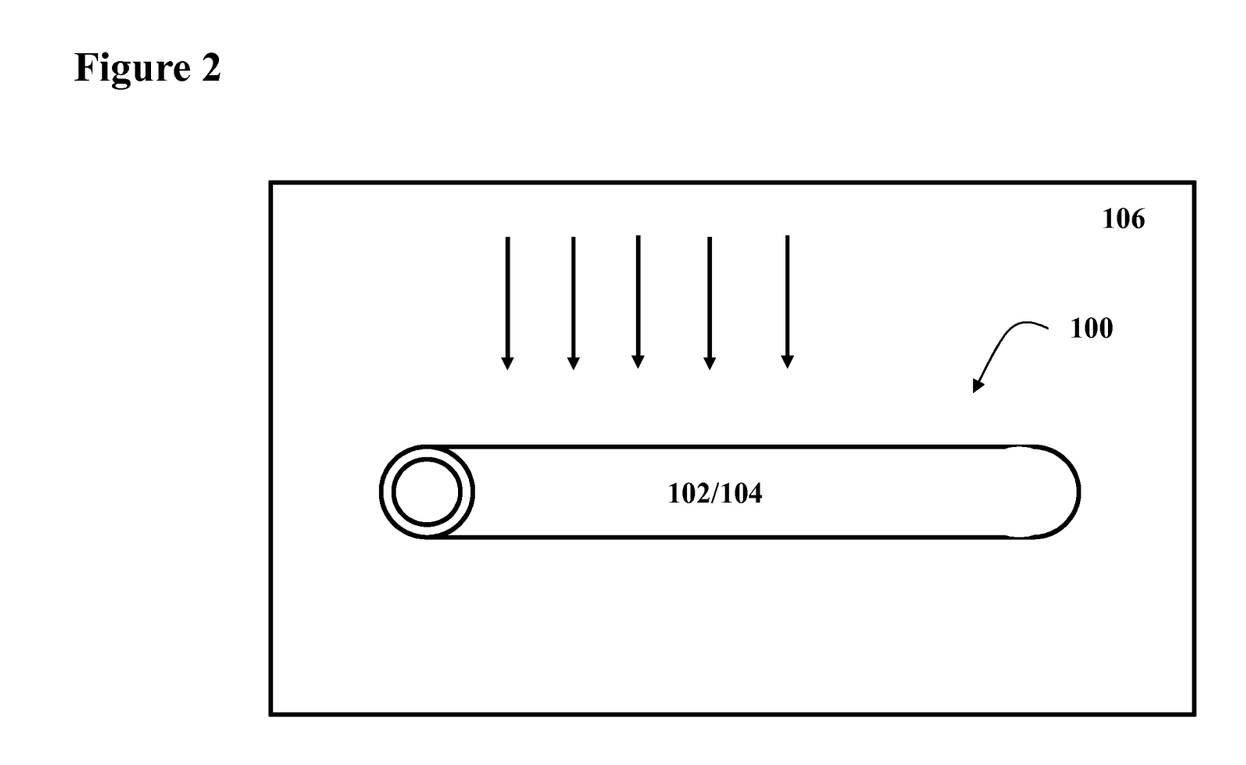
FIG. 2 shows a schematic diagram of a process of making a weld filler metal according to embodiments of the disclosure.

Turning to FIG. 2, following enclosing of welding rod 102 in first foil layer 104, sintering of welding rod 102 and first foil layer 104 can be achieved, for instance, using furnace 106. In some embodiments, sintering, as understood in the art, can include heating welding rod 102 and first foil layer 104 at a predetermined temperature and for a predetermined amount of time based upon the melting point of first foil layer 104. In some embodiments, heating to between approximately 1038° C. (1900° F.) and approximately 1204° C. (2200° F.) for between approximately 2 minutes and approximately 10 minutes may be done. In further embodiments, the heating may be to approximately 1038° C. (1900° F.) for approximately 3 minutes.

Following sintering, a chemical composition of welding rod 102 and a composition of first foil layer 104 will combine to some degree, to provide a new composition for weld filler metal 100. As described above, weld filler metal 100 may now include between approximately 0.1% and approximately 2.0% of at least one of B, Si, and Ge. In one example, a MarM247 filler rod of 0.04 inch diameter was wrapped with Amdry 775 brazing tape of 0.003 inch thickness and 0.5 inch width. This rod was sintered at 1038° C. (1900° F.) for 3 minutes. The weight and composition of the bare rod, tape, wrapped rod, and sintered wrapped rod were measured. The results are in Table 3 below.

Summary of Weight Before and After Sintering, g

TABLE 3

| Weight, g | Bare Rod | Rod + Tape (before sintering) | Assembling Rod (after sintering) | Braze Tape on Rod (before sintering) | Braze Material on Rod after sintering |
|---|---|---|---|---|---|
| MarM247 | 3.62 | 5.53 | 5.37 | 1.91 | 1.75 |

As can be seen in Table 3, some of the material is lost during sintering, so the material compositions should be carefully chosen to achieve the desired end composition of weld filler metal 100. Table 4 shows an analysis of the composition of the original filler rod and braze tape, as well as the weight of composition of each in the sintered rod and the overall composition by weight and percent in the final weld filler metal 100.

Chemical Composition of the Original MarM247 Rod and Amdry 775 Tape, and Final Sintering Rod, %

TABLE 4

|  | C | Cr | Co | W | Mo | Ta | Al | Ti | Hf | B | Zr | Ni |
|---|---|---|---|---|---|---|---|---|---|---|---|---|
| Original MarM247, % | 0.15 | 8.40 | 10.00 | 10.00 | 0.70 | 3.00 | 5.50 | 1.00 | 1.50 | 0.02 | 0.05 | 59.69 |
| Original Amdry775, % |  | 15.00 |  |  |  |  |  |  |  | 3.00 |  | 82.00 |
| Elements of MarM247 in sintered rod, g | 0.01 | 0.30 | 0.36 | 0.36 | 0.03 | 0.11 | 0.20 | 0.04 | 0.05 | 0.0005 | 0.00 | 2.16 |
| Elements of AMDRY 775 in sintered rod, g |  | 0.26 |  |  |  |  |  |  |  | 0.05 |  | 1.44 |
| Comp. in sintered rod, g | 0.01 | 0.57 | 0.36 | 0.36 | 0.03 | 0.11 | 0.20 | 0.04 | 0.05 | 0.05 | 0.00 | 3.60 |
| Comp. in sintered rod, % | 0.10 | 10.55 | 6.74 | 6.74 | 0.47 | 2.02 | 3.71 | 0.67 | 1.01 | 0.99 | 0.03 | 66.97 |

As can be seen in Table 4, the boron content of MarM247 welding rod is increased from 0.02% to 0.99% in weld filler metal 100 after application of first foil layer 104 (Amdry775, B content 3.00%) and sintering. Although Tables 2-3 are only one example, this example illustrates the ease with which a new weld filler metal 100 can be developed on a small scale (a single rod) in a short amount of time.

Figure 3:
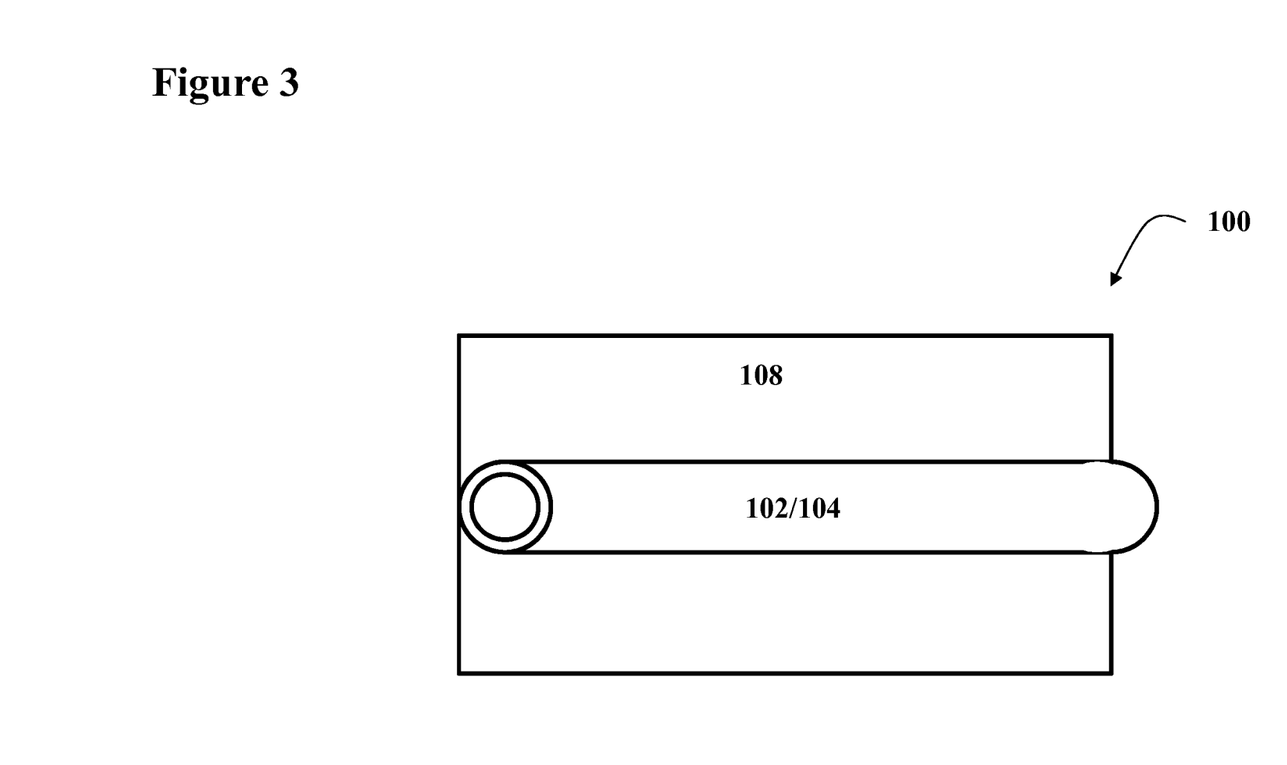
FIG. 3 shows a schematic diagram of a process of making a weld filler metal according to embodiments of the disclosure.

Returning to the Figures, FIG. 3 shows an embodiment in which, prior to sintering as illustrated in FIG. 2, at least a second foil layer 108 is enclosed or wrapped around welding rod 102, which includes first foil layer 104 already wrapped around welding rod 102. In some embodiments, second foil layer 108 may comprise a second foil which has a different and distinct composition from that of the foil of first foil layer 104. In these embodiments, second foil layer 108 may include at least 1% a different element (or of the same element) of the B, Si, or Ge than that of the first foil layer 104, which may or may not include an adhesive layer as described above. In another embodiment, second foil layer 108 may include the same foil as first foil layer 104, in which case it may be at least one additional layer of the same foil over welding rod 102 and first foil layer 104. More layers may be added over this, including the same or different foils in at least a third foil layer.

Figure 4:
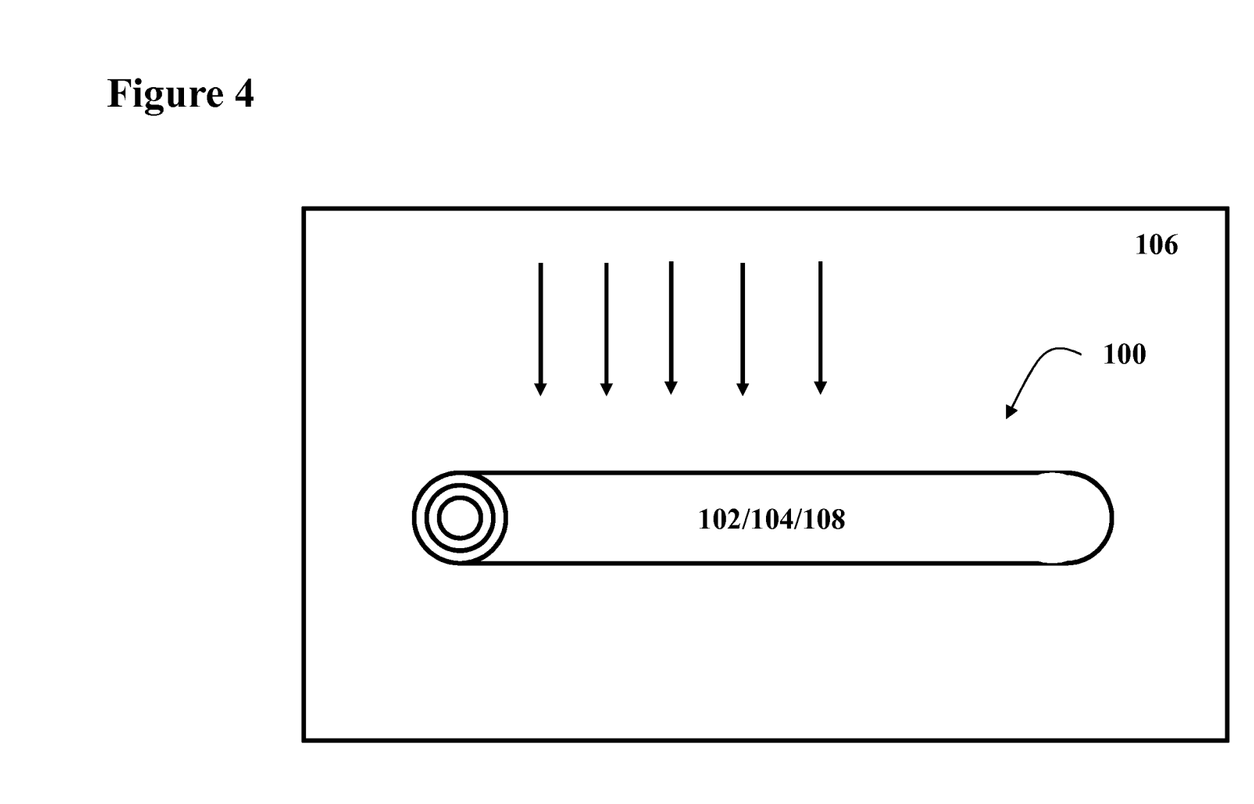
FIG. 4 shows a schematic diagram of a process of making a weld filler metal according to embodiments of the disclosure.

FIG. 4 illustrates the sintering by furnace 106 of welding rod 102 and multiple layers, including first foil layer 104 and second foil layer 108, as well as any additional layers which may have been added prior to sintering. These embodiments can be utilized when second foil layer 104 and second foil layer 108, as well as any additional layers, have a similar or the same melting point and can effectively be sintered at the same time.

Figure 5:
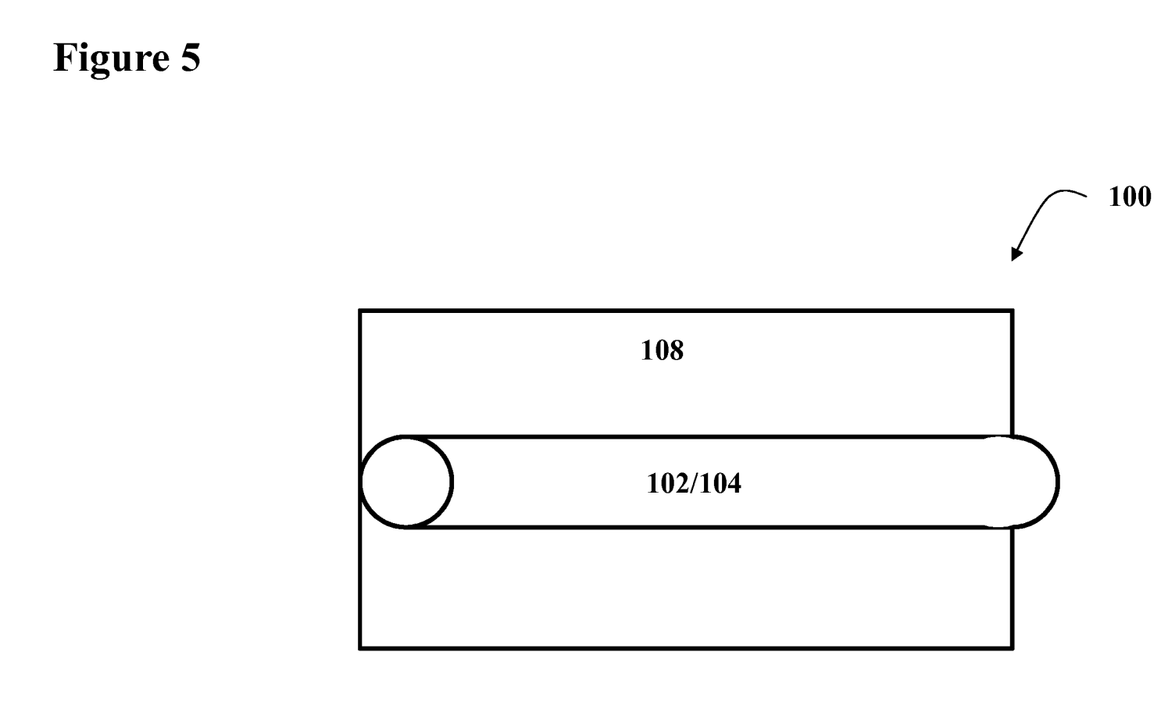
FIG. 5 shows a schematic diagram of a process of making a weld filler metal according to embodiments of the disclosure.
Figure 6:
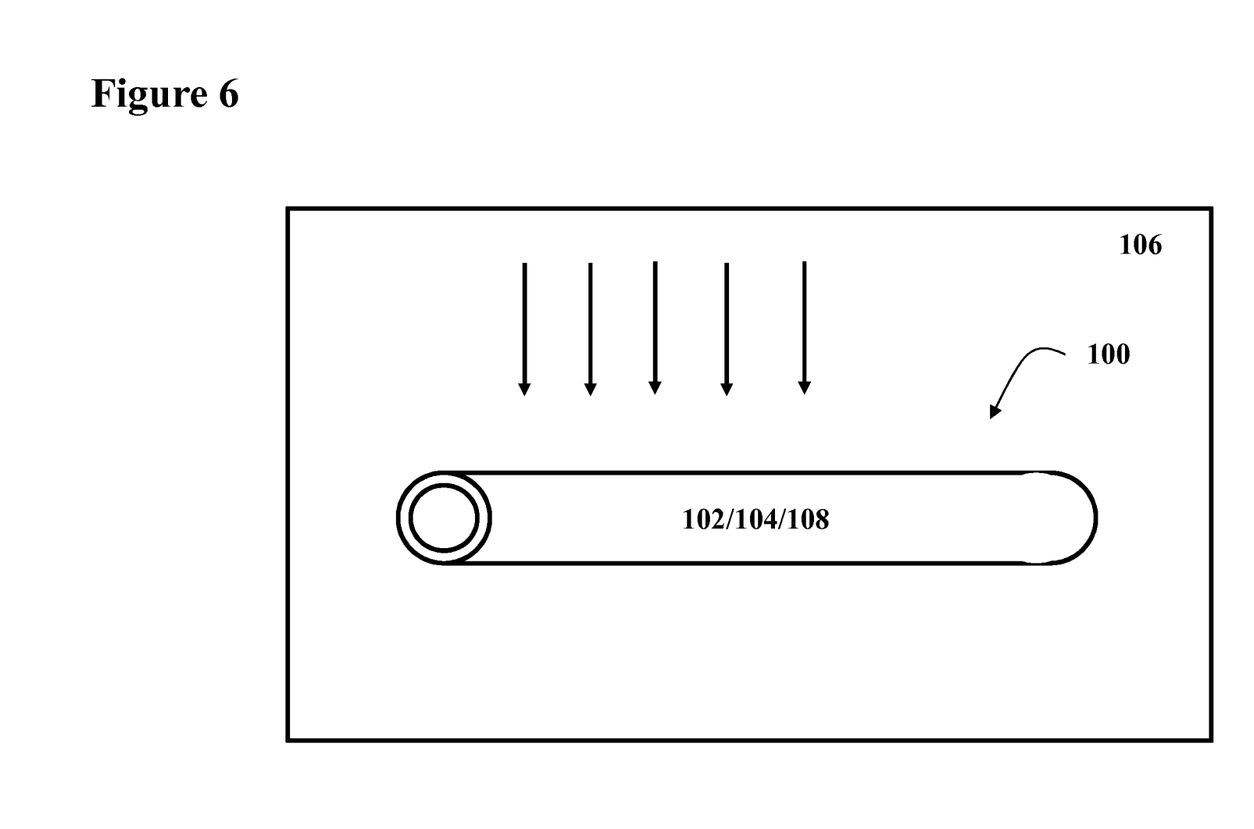
FIG. 6 shows a schematic diagram of a process of making a weld filler metal according to embodiments of the disclosure.

In contrast to welding multiple layers in a single sintering process, in embodiments where second foil layer 108 (and any additional layers added) have a different melting point, or in embodiments where many layers may be used and the sintering may result in a less than complete sintering of the material compositions, second foil layer 108 may enclose welding rod 102 (and first foil layer 104) following the first sintering. That is, welding rod 102 and first foil layer 104, as illustrated in FIG. 5, will have already been sintered into a single rod, in some embodiments with a substantially consistent composition throughout the rod, prior to the addition of second foil layer 108. Any number of additional layers may be added before the next sintering (FIG. 6), or each additional foil layer can be added and sintered between each additional foil layer addition. As above, each additional foil layer beyond second foil layer 108 may include the same or different foils, with the same or different size or shapes, than the two before, with the same or distinct compositions, and each may include at least 1% of at least one of B, Si, and Ge and may or may not include an adhesive layer. Each additional sintering as shown in FIG. 6 may be achieved at the parameters defined above. Additional time may be utilized for the sintering of a plethora of layers, as it may take longer to sinter the extra thickness.

Additionally, disclosed herein is weld filler metal 100 made by the above described methods. For instance, weld filler metal may be made by a method including enclosing welding rod 102 in a first foil layer 104 and sintering welding rod 102 and second foil layer 104. First foil layer 104 may include at least 1% of at least one of boron, silicon, and germanium, such that weld filler metal 100 comprises a composition that includes between approximately 0.1% and approximately 2.0% of at least one of boron, silicon, and germanium following sintering of welding rod 102 and first foil layer 104. Further embodiments including second foil layer 108, additional foil layers, and multiple sintering of the layers as described above are equally applicable to these embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of making a weld filler metal for use in a welding process with a superalloy, the method comprising:
wrapping a welding rod in a first foil layer, the welding rod formed from a material including at least one of MarM247, IN738, R80, IN939, R142, R195, H188, H25, FSX414, RN2, or GTD111, and the first foil layer is formed from a solid-state brazing alloy material including one of BNi-9, BNi-2, BNi-5, BRB, and DF4B;
sintering the welding rod and the first foil layer at a temperature range that is below a melting temperature of the material forming the welding rod to combine at least a portion of the first foil layer and the welding rod,
wherein combining at least the portion of the first foil layer and the welding rod reduces a collective melting temperature of the weld filler metal.

2. The method of claim 1, wherein the first foil layer includes an adhesive layer.

3. The method of claim 1, wherein the distinct material of the first foil layer includes at least one of boron, silicon, and germanium, and the first foil layer includes at least 1% of at least one of the boron, the silicon, and the germanium.

4. The method of claim 1, wherein a composition of the weld filler metal includes between approximately 0.1% and approximately 2.0% of at least one of boron, silicon, and germanium.

5. The method of claim 1, the method further comprising:
enclosing the welding rod and the first foil layer, prior to the heating, in at least a second foil layer.

6. The method of claim 5, wherein the second foil layer comprises a second layer having a composition the same as a composition of the first foil layer.

7. The method of claim 5, wherein the second foil layer comprises a second foil having a distinct composition from a composition of the first foil layer.

8. The method of claim 7, wherein the second foil layer includes an adhesive layer.

9. The method of claim 7, wherein the second foil layer includes at least 1% of at least one of boron, silicon, and germanium.

10. The method of claim 1, further comprising:
enclosing the welding rod and the first foil layer, following the heating, in at least a second foil layer; and
sintering the welding rod, the first foil layer, and the second foil layer.

11. The method of claim 10, wherein the second foil layer comprises a second layer having a composition the same as a composition of the first foil layer.

12. The method of claim 10, wherein the second foil layer comprises a second foil having a distinct composition from a composition of the first foil layer.

13. The method of claim 12, wherein the second foil layer includes an adhesive layer.

14. The method of claim 12, wherein the second foil layer includes at least 1% of at least one of boron, silicon, and germanium.

15. The method of claim 10, wherein the heating includes heating at a temperature between approximately 1038° C. to approximately 1204° C. for between approximately 2 minutes and approximately 10 minutes.

16. The method of claim 1, wherein the first foil layer comprises brazing tape.

17. The method of claim 1, wherein the first foil layer is approximately 0.001 to 0.005 inches thick.

18. The method of claim 1, wherein the sintering the welding rod and the first foil layer includes sintering the welding rod and the first foil layer at a temperature between approximately 1038° C. to approximately 1204° C. for between approximately 2 minutes and approximately 10 minutes.

19. The method of claim 1, wherein the sintering the welding rod and the first foil layer includes sintering the welding rod and the first foil layer at the temperature range that is above the melting temperature of the solid-state brazing alloy material of the first foil layer.

* * * * *